United States Patent
Krupo et al.

(10) Patent No.: US 10,072,870 B2
(45) Date of Patent: Sep. 11, 2018

(54) AIR INLET HOOD FOR A VENTILATION SYSTEM

(71) Applicant: Modine Manufacturing Company, Racine, WI (US)

(72) Inventors: Mark Krupo, New Berlin, WI (US); Amit Ingle, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 780 days.

(21) Appl. No.: 14/487,707

(22) Filed: Sep. 16, 2014

(65) Prior Publication Data

US 2016/0076788 A1    Mar. 17, 2016

(51) Int. Cl.
*F24F 7/00* (2006.01)
*F24F 13/08* (2006.01)
*F24F 3/044* (2006.01)

(52) U.S. Cl.
CPC ............ *F24F 13/082* (2013.01); *F24F 3/044* (2013.01)

(58) Field of Classification Search
CPC .................................................... F24F 13/082

USPC .................................................. 454/275–283
See application file for complete search history.

(56) References Cited

U.S. PATENT DOCUMENTS

| 2,557,775 | A | * | 6/1951 | Yancho | .................... | E04F 10/08 |
| | | | | | | 52/16 |
| 4,759,196 | A | * | 7/1988 | Davis | .................... | F24F 1/0007 |
| | | | | | | 454/236 |
| 8,528,578 | B2 | | 9/2013 | Mowatt, Sr. | | |
| 2005/0109055 | A1 | | 5/2005 | Goetzinger et al. | | |
| 2013/0247479 | A1 | | 9/2013 | Chin-Yee | | |

* cited by examiner

*Primary Examiner* — Vivek Shirsat
(74) *Attorney, Agent, or Firm* — Michael Best & Friedrich LLP; Jeroen Valensa; Michael Bergnach

(57) ABSTRACT

An air inlet hood for use with a ventilation system has an air inlet face to receive a flow of fresh ventilation air, and an air outlet face to deliver the air into the ventilation system. A rainwater collection channel is disposed along edges bounding the air inlet face to collect rainwater falling on the air inlet hood. A rainwater reservoir receives the collected rainwater from the rainwater collection channel, and dispenses the collected rainwater away from the air inlet face in order to prevent rainwater from being entrained into the ventilation air.

20 Claims, 3 Drawing Sheets

US 10,072,870 B2

AIR INLET HOOD FOR A VENTILATION SYSTEM

BACKGROUND

Ventilation systems are commonly used to provide fresh air to interior spaces of buildings in order to provide climate conditioning and control. Such systems often are used to deliver a quantity of fresh or "make-up" air to the building interior so that stale, polluted, or otherwise undesirable air within the building ca be at least partially replaced with fresh air. To that end, ventilation systems are oftentimes located exterior to the building itself, such as on the rooftop or adjacent to an outer wall, so that ready access is provided to fresh air and so that the replaced air can be easily dispersed to the atmosphere.

However, such exterior placement of the ventilation system also results in the system being exposed to the elements, including to precipitation that might occur. This exposure is especially pronounced when the ventilation system is situated on the rooftop of a building, where it might not be easily sheltered from the elements.

In general, the undesirable ingress of precipitation (for example, rainwater) into the ventilation system itself can be avoided through the proper design of the ventilation system enclosure. However, the substantial quantity of fresh air that can be induced to flow into the ventilation system in order to provide its desired functionality can cause a significant amount of precipitation to be ingested in along with the fresh air. This precipitation, usually but not always rainwater, is entrained in the air flow due to the relatively strong suction effect of the ventilation system. The ingested rain water can collect within the system, or can be discharged into the interior space of the building, neither of which is desirable.

SUMMARY

According to one embodiment of the invention, an air inlet hood for a ventilation system includes an air outlet face oriented in a vertical plane and an air inlet face oriented at an angle between 0° and 90° to the air outlet face. The air inlet face is bounded by several edges, with a rainwater collection channel disposed along at least one edge and a rainwater reservoir disposed along at least one other edge. The rainwater reservoir receives collected rainwater from the rainwater collection channel and dispenses the collected rainwater away from the air inlet face.

According to another embodiment of the invention, a method of dispersing rainwater away from an air inlet of a ventilation system includes: receiving falling rainwater onto surfaces of an air inlet hood portion of the ventilation system; collecting the received rainwater in a rainwater collection channel disposed along edges of the inlet hood portion; using gravity forces to direct the received rainwater into a rainwater reservoir disposed along an edge of the inlet hood portion; and dispensing the received rainwater from the rainwater reservoir away from the air inlet.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
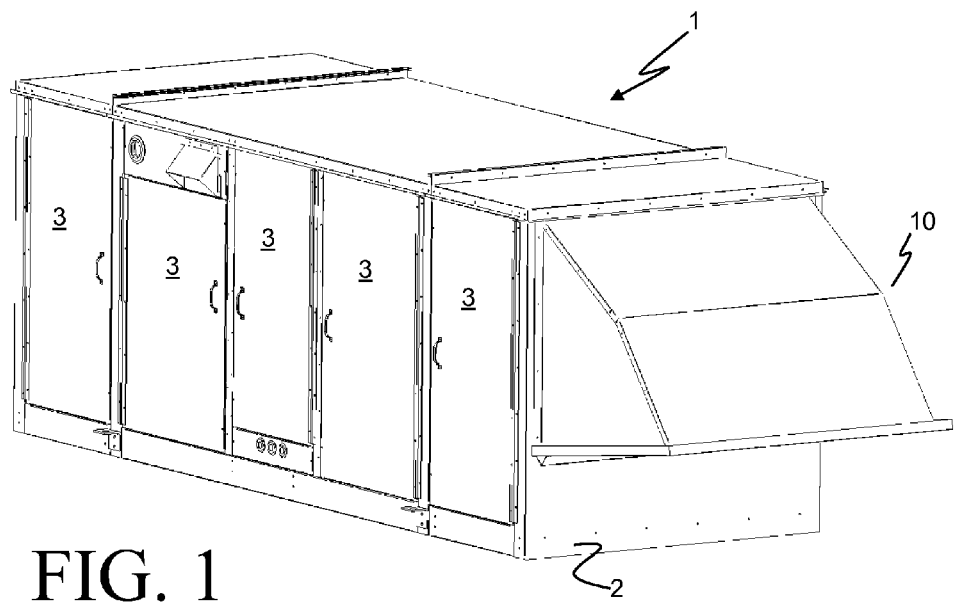
FIG. 1 is a perspective view of a ventilation system with an air inlet hood according to an embodiment of the present invention.

A ventilation system 1 with an air inlet hood 10 according to an embodiment of the invention is depicted in FIG. 1. The ventilation system 1 can be used to provide fresh and/or conditioned air to a building or other type of structure, and can advantageously be positioned on a rooftop of the building or, alternatively, adjacent to the building. Fresh outside air is drawn into the ventilation system 1 through the air inlet hood and is delivered to the interior of the building. Optionally, a variety of conditioning equipment can be provided within the ventilation system 1 in order to properly condition the air before delivering it to the building. By way of example, such conditioning equipment can include filters, evaporating coils, dehumidifiers, humidifiers, and heaters, among others. Multiple access doors 3 can be provided along one or more external surfaces of the ventilation system 1 in order to provide access to the components located within.

Turning now to FIGS. 2-5, the air inlet hood will be described in more detail. The air inlet hood 10 is of a sheet metal construction, and has an air inlet opening 12 and an air outlet opening 11. A frame 17 extends around at least a portion of the periphery of the air outlet opening 11, and a series of mounting holes 18 are provided at regularly spaced intervals along the frame 17 to allow the air inlet hood to be mounted to a side wall 2 of the ventilation system 1 so that the air outlet opening 11 is arranged in a vertical plane. An aperture (not shown) roughly corresponding in size and shape to the air outlet opening 11 can be provided in the side wall 2, so that air can be directed into the ventilation system 1 through the air inlet hood 10.

The air inlet hood 10 is bounded by a plurality of wall sections 13, each of which is fabricated from sheet metal. Planar sections of the sheet metal used to form the wall sections 13 can be shaped, bent, or otherwise formed in order to provide the desired shape of the inlet hood 10. As shown in the exemplary embodiment, edges of at least some of the wall sections 13 can be bent to form tabs that overlay a portion of another one of the wall sections 13, allowing for joining together of the wall sections 13 by riveting, welding, or other known joining processes. In the embodiment depicted in FIGS. 2-4, the wall sections 13 are shown as generally planar sections. However, in other alternative embodiments at least some of the wall sections 13 can have a non-planar shape such as, for example, a curved shape.

The inlet hood 10 provides a degree of protection from the environment of the ventilation system 1 by making it more difficult for precipitation and other environmental debris to enter into the ventilation system 1 along with the fresh air that is directed into the ventilation system 1. Generally speaking, a blower or other air mover is typically contained within the ventilation system 1 to direct fresh air, or a combination of fresh air and recycled air, through an internal space. The air inlet opening 12 is fluidly connected to a suction side of such a blower or other air mover in order to provide a pathway by which the suction of the blower or other air mover can direct fresh outside air thereto. During periods of rain, rainwater can be entrained into that flow of fresh air and can collect within the ventilation system 1 or can be discharged into the internal space along with the ventilation air, both of which are undesirable.

In order to address the undesirable effects of rainwater entrainment, the air inlet hood 10 is fashioned so as to arrange the air inlet opening 12 at some acute angle 25 between zero degrees and ninety degrees of inclination to the vertical plane of the air outlet opening 11. Preferably the angle 25 is between forty-five degrees and ninety degrees, so that the general direction of the air flowing into the air inlet opening 12, indicated by the arrow 26, is substantially opposite to the direction of gravity and, consequently, substantially opposite to the direction that the rain would be falling. This then requires that the rainwater, in order to be entrained into the air entering into the air inlet opening 12, must be substantially reversed in direction against its momentum, and the amount of rainwater that is so entrained can be substantially reduced.

However, while this can reduce the amount of rainwater entrainment, it does not completely eliminate it. Owing in part to the substantial projected area of the air inlet hood 10 in a horizontal plane, a large amount of rainwater can be directed by the walls 13 to the edges surrounding the air inlet opening 12. During periods of heavy rainfall, this can lead to a steady stream of water, in some cases akin to a waterfall, descending from the edges of the air inlet opening 12. The fresh air being pulled into the ventilation system 1 through the air inlet opening 12 must pass through that stream of water, and some entrainment of rainwater into that stream of air is thus inevitable.

The aforementioned entrainment has been addressed in the present invention through the addition of a rainwater collection channel 14 extending at least partway along the periphery of the air inlet opening 12. The rainwater collection channel 12 provides a pathway of some depth along several of those edges bounding the air inlet opening 12, and the rainwater descending from the wall sections 13 is received into the rainwater collection channel 14 rather than dropped off of the edges. Since the rainwater collection channel 14 extends along the periphery of the air inlet opening 12, it is also oriented at the angle 25 relative to a vertical direction, so that the collected rainwater is forced to flow by gravity to the lowermost point of the channel 14, adjacent to the wall 2 to which the air inlet hood 10 is attached.

Figure 2:
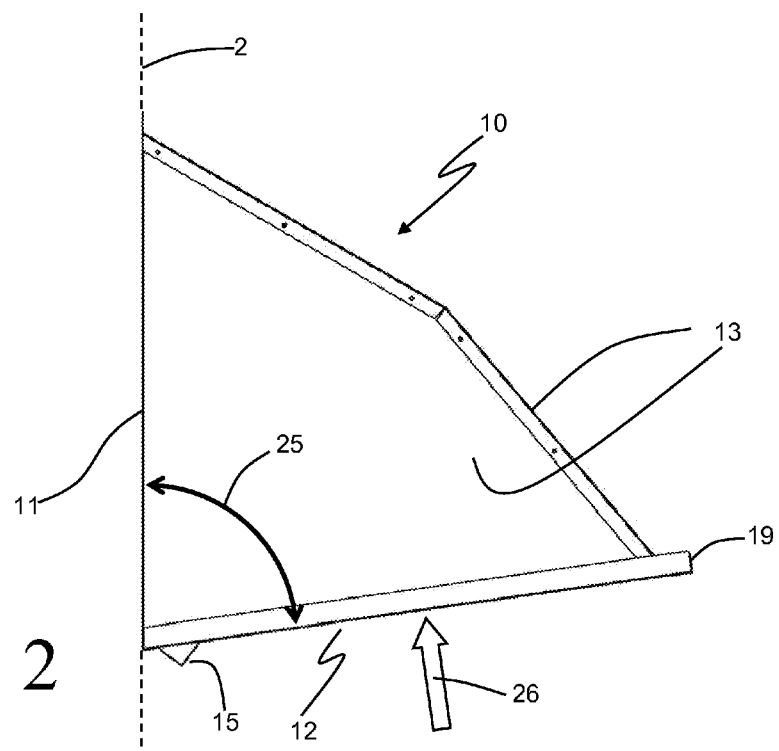
FIG. 2 is a plan view of the air inlet hood of FIG. 1 in an installed orientation.
Figure 3:
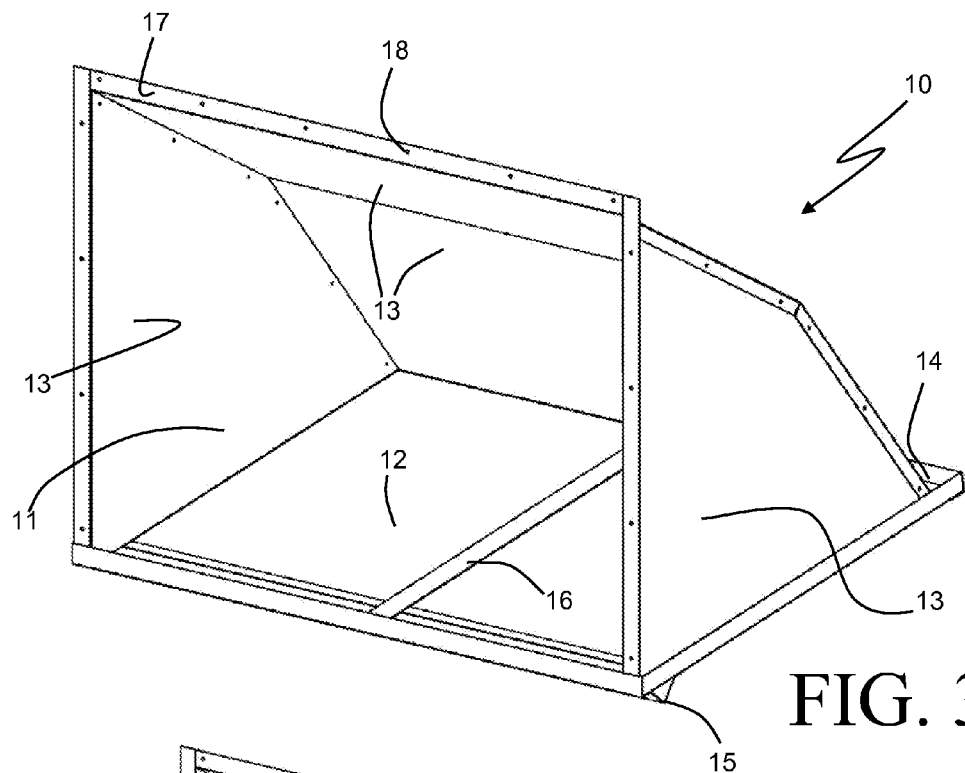
FIG. 3 is a perspective view of the air inlet hood of FIG. 1.
Figure 4:
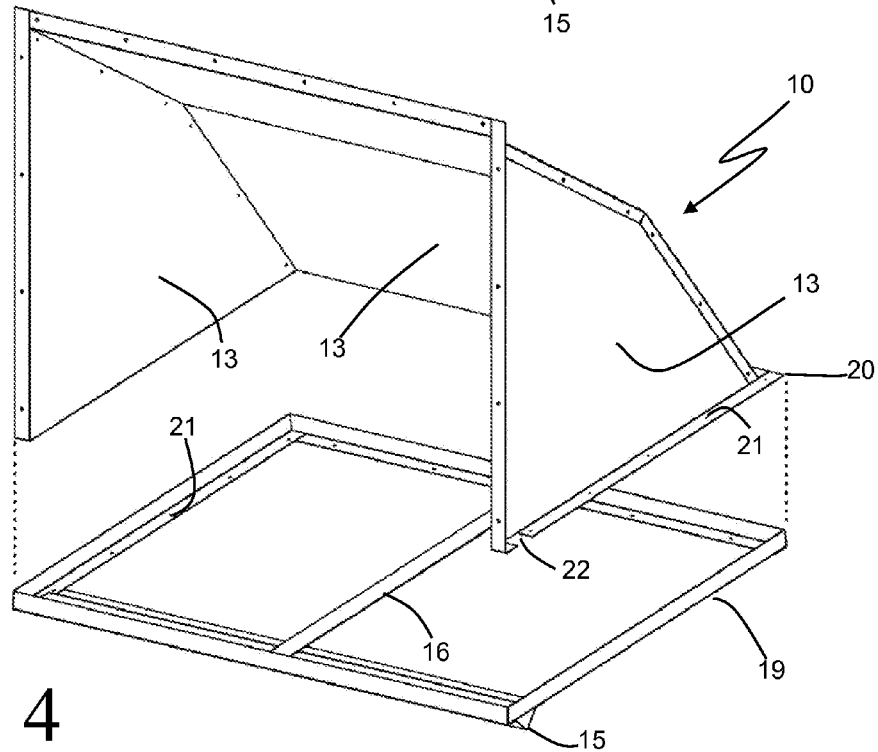
FIG. 4 is a partially exploded perspective view of the air inlet hood of FIG. 1.

A rainwater reservoir 15 is disposed along the lowermost edge of the air inlet opening 12, that edge being the one immediately adjacent to the mounting wall 2 in the exemplary embodiment, as best seen in FIG. 2. The rainwater reservoir 15 is of a V-shape with the open end facing upward so that rainwater can be received into and retained in the reservoir 15. The air being directed through the air inlet hood 10 passes over that open end but does not entrain water from the reservoir 15.

In order to prevent the rainwater reservoir 15 from overfilling and discharging rainwater out of the top, provisions are made to discharge the collected rainwater in a direction away from the air inlet opening 12. In the exemplary embodiment, the ends of the V-shaped reservoir 15 are left open so that the rainwater received into the reservoir 15 can be discharged therefrom towards the sides of the ventilation system 1. In other embodiments, those ends can instead be capped off and apertures can be provided to allow for the removal of the accumulated rainwater. In some embodiments the discharged rainwater can be further channeled away from the air inlet opening 12 through the use of gutters, drain hoses, or the like.

In the exemplary embodiment, the air inlet opening 12 is of a rectangular shape and is therefore bounded by four edges. The rainwater collection channel 14 is arranged along three of those edges, specifically: a generally horizontal edge located at an uppermost end of the air inlet opening 12, and two generally parallel edges extending at the angle 25 from the uppermost end of the air inlet opening 10 to a lowermost end. The rainwater reservoir is located along the fourth edge, which is a generally horizontal edge located at the lowermost end of the air inlet opening 12.

Figure 5:
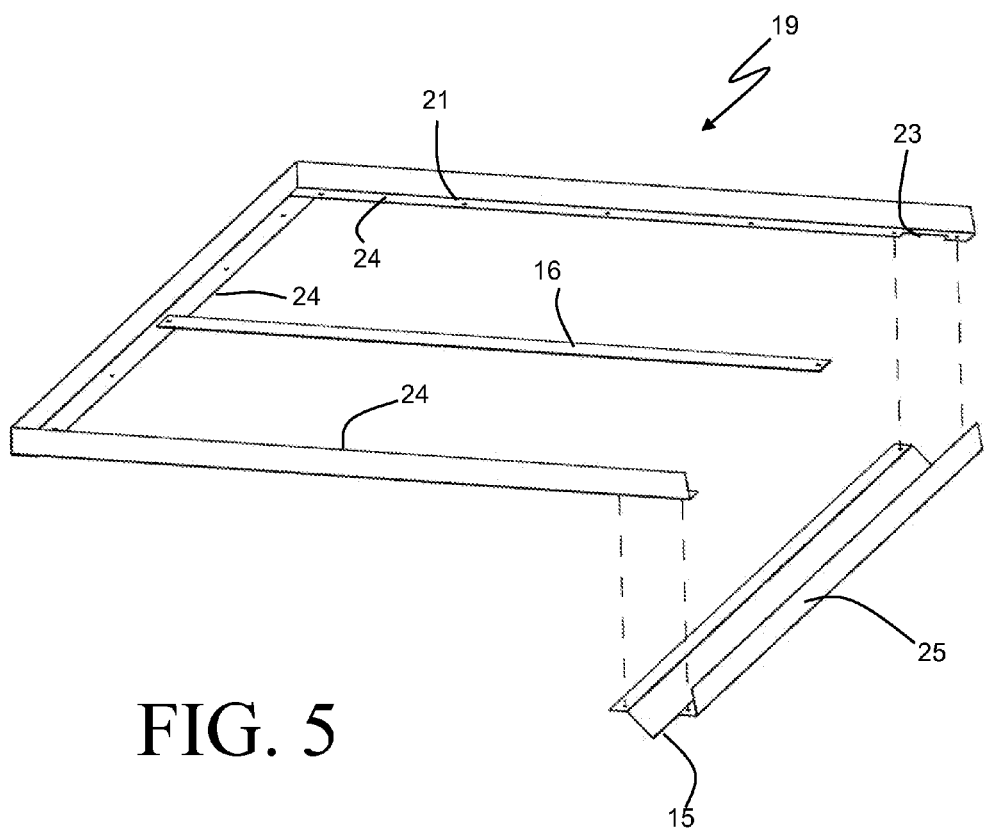
FIG. 5 is a partially exploded view of select portions of the air inlet hood of FIG. 1.

The rainwater collection channel 14 and rainwater reservoir 15 can in part be provided through a frame 19 that is attached to the air inlet hood 10 at the air inlet opening 12. The frame 19 includes multiple sheet metal angle pieces 24 that are joined together to partially defined the rainwater collection channel 14. As best seen in FIG. 5, the angle pieces 24 define all but one of the edges of the frame 19, with that final edge being provided by a formed sheet metal part 25 which also defines the V-shaped reservoir 15. Apertures 23 are provided in two of the angle pieces 24 at locations corresponding to the reservoir 15 to allow water to pass from the collection channel 14 to the reservoir 15. A stiffening bar 16 is optionally provided in order to improve the rigidity of the frame 19. The angle pieces 24, the formed part 25, and the stiffening bar 16 can be joined together by rivets or welding or the like. Additional components not shown (such as, for example, a filter screen) can also be included in the frame 19.

It should be apparent to those skilled in the art of sheet metal forming that the V shape of the reservoir 15 can be advantageously formed in the part 25 by way of three bending operations. However, it should be understood that shapes other than a V can also be attained without departing from the functionality and intent of the reservoir 15.

Bent flanges 20 can be provided along edges of the wall sections 13 in order to facilitate in assembling the frame 19 to the walls 13. Once assembled, the walls 13 and flanges 20 cooperate with the angle pieces 24 to define the rainwater collection channel 14. The frame 19 can be assembled to the walls 13 through rivets, welding, or the like. When rivets or other similar mechanical fasteners are used for assembly, holes 21 can be provided in matching alignment along the flanges 20 and the angle pieces 24 to enable the assembly.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. An air inlet hood for a ventilation system, comprising:
an air outlet face oriented in a vertical plane;
an air inlet face oriented at an angle between zero degrees and ninety degrees to the air outlet face, the air inlet face being bounded by a plurality of edges;
a rainwater collection channel disposed along at least two of the plurality of edges; and
a rainwater reservoir disposed along another of the plurality of edges immediately adjacent to the vertical plane to receive collected rainwater from the rainwater collection channel and to dispense collected rainwater away from the air inlet face and away from the ventilation system, wherein the rainwater reservoir extends between opposite sides of the rainwater collection channel.

2. The air inlet hood of claim 1, wherein the rainwater reservoir is disposed along the lowermost one of the plurality of edges.

3. The air inlet hood of claim 1, wherein the rainwater reservoir comprises a V-shaped channel.

4. The air inlet hood of claim 1, wherein the rainwater reservoir is configured to dispense collected rainwater towards opposing sides of the ventilation system.

5. The air inlet hood of claim 1, further comprising a plurality of sides extending between the inlet face and the outlet face, the plurality of sides at least partially defining the rainwater collection channel.

6. The air inlet hood of claim 1, wherein said angle is between forty-five degrees and ninety degrees.

7. The air inlet hood of claim 1, further comprising:
a plurality of wall sections; and
a frame joined to the plurality of wall sections, the frame being arranged at the air inlet face and at least partially defining the rainwater collection channel and the rainwater reservoir.

8. The air inlet hood of claim 1, wherein the rainwater collection channel comprises a first channel portion arranged along a horizontal edge of one of the plurality of edges, and second and third channel portions arranged at an acute angle to the air outlet face, each of the second and third channel portions being in fluid communication with an end of the first channel portion.

9. The air inlet hood of claim 8, wherein each of the second and third channel portions includes an aperture disposed above the rainwater reservoir.

10. A method of dispersing rainwater away from an air inlet of a ventilation system, comprising:
receiving falling rainwater onto surfaces of an air inlet hood portion of the ventilation system;
collecting the received rainwater in a rainwater collection channel disposed along at least two sides of the periphery of the inlet hood portion;
using gravity forces to direct the received rainwater into a rainwater reservoir extending between opposite sides of the rainwater collection channel and disposed below an edge of the inlet hood portion; and
dispensing the received rainwater from the rainwater reservoir away from the air inlet,
wherein the rainwater reservoir changes the direction of the rainwater from flowing along the inlet hood portion to flowing away from the inlet hood portion.

11. The method of claim 10, wherein using gravity forces to direct the received rainwater into the rainwater reservoir includes receiving rainwater into the rainwater reservoir at two separate, spaced-apart locations.

12. An air inlet hood for a ventilation system, comprising:
a plurality of walls;
an air outlet opening located in a first plane at one end of the plurality of walls;
an air inlet opening located in a second plane at another end of the plurality of walls;
a collection channel at least partially disposed along at least two sides of the second plane and at least partially disposed along the first plane; and
a reservoir extending between opposite sides of the collection channel.

13. The air inlet hood of claim 12, wherein the reservoir is at least partially disposed along a lowermost edge of the air inlet face that is immediately adjacent to the first plane.

14. The air inlet hood of claim 12, wherein the reservoir is at least partially disposed within the air inlet hood.

15. The air inlet hood of claim 12, wherein the reservoir is disposed along a lowermost edge of the air inlet opening.

16. The air inlet hood of claim 12, wherein the collection channel includes a horizontal portion at an uppermost end of the air inlet opening and two parallel portions that each extend from the uppermost end to a lowermost end of the air inlet opening.

17. The air inlet hood of claim 12, wherein the air outlet opening is at least partially defined by the plurality of walls, and wherein the air inlet opening is at least partially defined by the plurality of walls.

18. The air inlet hood of claim 12, wherein the collection channel includes at least one aperture corresponding to the reservoir to allow water to pass from the collection channel to the reservoir.

19. The air inlet hood of claim 12, wherein the reservoir includes at least one side-facing open end facing away from the ventilation system to dispense collected rainwater away from the air inlet opening and away from the ventilation system.

20. The air inlet hood of claim 12, wherein the collection channel and the reservoir are connected to form a frame that surrounds the air inlet opening, and wherein at least one aperture in the collection channel corresponds to an upward facing open end of the reservoir.

* * * * *